United States Patent
Huberman et al.

(10) Patent No.: US 11,049,069 B2
(45) Date of Patent: *Jun. 29, 2021

(54) METHOD AND SYSTEM FOR LOCALIZING TRACKING DEVICES INDOORS AND OUTDOORS

(71) Applicant: MAPSTED CORP., Mississauga (CA)

(72) Inventors: Sean Huberman, Guelph (CA); Paramvir Singh Nagpal, Brampton (CA)

(73) Assignee: MAPSTED CORP., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,678

(22) Filed: Jul. 23, 2019

(65) Prior Publication Data

US 2020/0051007 A1 Feb. 13, 2020

Related U.S. Application Data

(63) Continuation of application No. 16/101,816, filed on Aug. 13, 2018, now Pat. No. 10,423,926.

(51) Int. Cl.
| | |
|---|---|
| *G08B 21/00* | (2006.01) |
| *G06Q 10/08* | (2012.01) |
| *H04W 8/00* | (2009.01) |
| *H04W 4/38* | (2018.01) |
| *G01S 19/00* | (2010.01) |
| *H04W 52/38* | (2009.01) |
| *G06F 16/907* | (2019.01) |

(52) U.S. Cl.
CPC ............ *G06Q 10/087* (2013.01); *G01S 19/00* (2013.01); *G06F 16/907* (2019.01); *H04W 4/38* (2018.02); *H04W 8/005* (2013.01); *H04W 52/38* (2013.01)

(58) Field of Classification Search
CPC ...... G06Q 10/087; H04W 4/38; H04W 8/005; H04W 52/38; H04W 4/33; H04W 4/35; H04W 4/029; G01S 19/00; G01S 5/0257; G01S 19/48; G06F 17/30997; G06F 16/907; H04B 17/318
See application file for complete search history.

(56) References Cited

U.S. PATENT DOCUMENTS

| | | | |
|---|---|---|---|
| 2009/0043504 A1* | 2/2009 | Bandyopadhyay | G01C 21/16 701/469 |
| 2015/0097731 A1* | 4/2015 | Russell | G01S 19/48 342/450 |

(Continued)

*Primary Examiner* — Mark S Rushing

(57) ABSTRACT

A method and a device for tracking an item using a tracking device associated with the item are described. The method, executed in a processor of the tracking device, comprises identifying a location state of the tracking device as one of an indoor location and an outdoor location relative to an indoor facility, based on at least one of satellite based data and connectivity to an access point in the indoor facility. Upon identifying the location state as the indoor location, a wireless transceiver and one or more sensor devices may be activated. The sensor devices may include at least one of a wireless signal strength sensor, a wireless signal connectivity sensor, an inertial sensor, a magnetic field sensor, a barometric sensor, and an ambient light sensor. Further, indoor localization data gathered by the sensor devices may be provided for localization.

20 Claims, 7 Drawing Sheets

(56) References Cited

U.S. PATENT DOCUMENTS

| | | | | |
|---|---|---|---|---|
| 2015/0119079 A1* | 4/2015 | Tarlazzi | ............... | H04W 24/00 |
| | | | | 455/456.1 |
| 2015/0341753 A1* | 11/2015 | Chen | ................... | H04B 17/318 |
| | | | | 455/456.1 |
| 2016/0379074 A1* | 12/2016 | Nielsen | ................. | H04N 7/181 |
| | | | | 348/143 |

* cited by examiner

METHOD AND SYSTEM FOR LOCALIZING TRACKING DEVICES INDOORS AND OUTDOORS

CROSS-REFERENCE TO RELATED APPLICATION

This application claims the benefit of priority to U.S. application Ser. No. 16/101,816 filed 13 Aug. 2018. Said U.S. application Ser. No. 16/101,816 is hereby incorporated in the entirety herein.

BACKGROUND

Generally, large facilities, such as warehouses and manufacturing units may store items or objects for various reasons, such as for manufacturing, for storage, and for delivering to other locations. Certain items in such facilities may not have a fixed position and may be moved time to time. These items may have to be tracked in real-time to determine their location to prevent them from being misplaced and stolen. Further, in certain cases, in addition to the items being moved inside facility, the items may also be moved between multiple facilities, thereby making it important to determine the facility, where the item currently is and also item's location within that facility.

DETAILED DESCRIPTION

Figure 1:
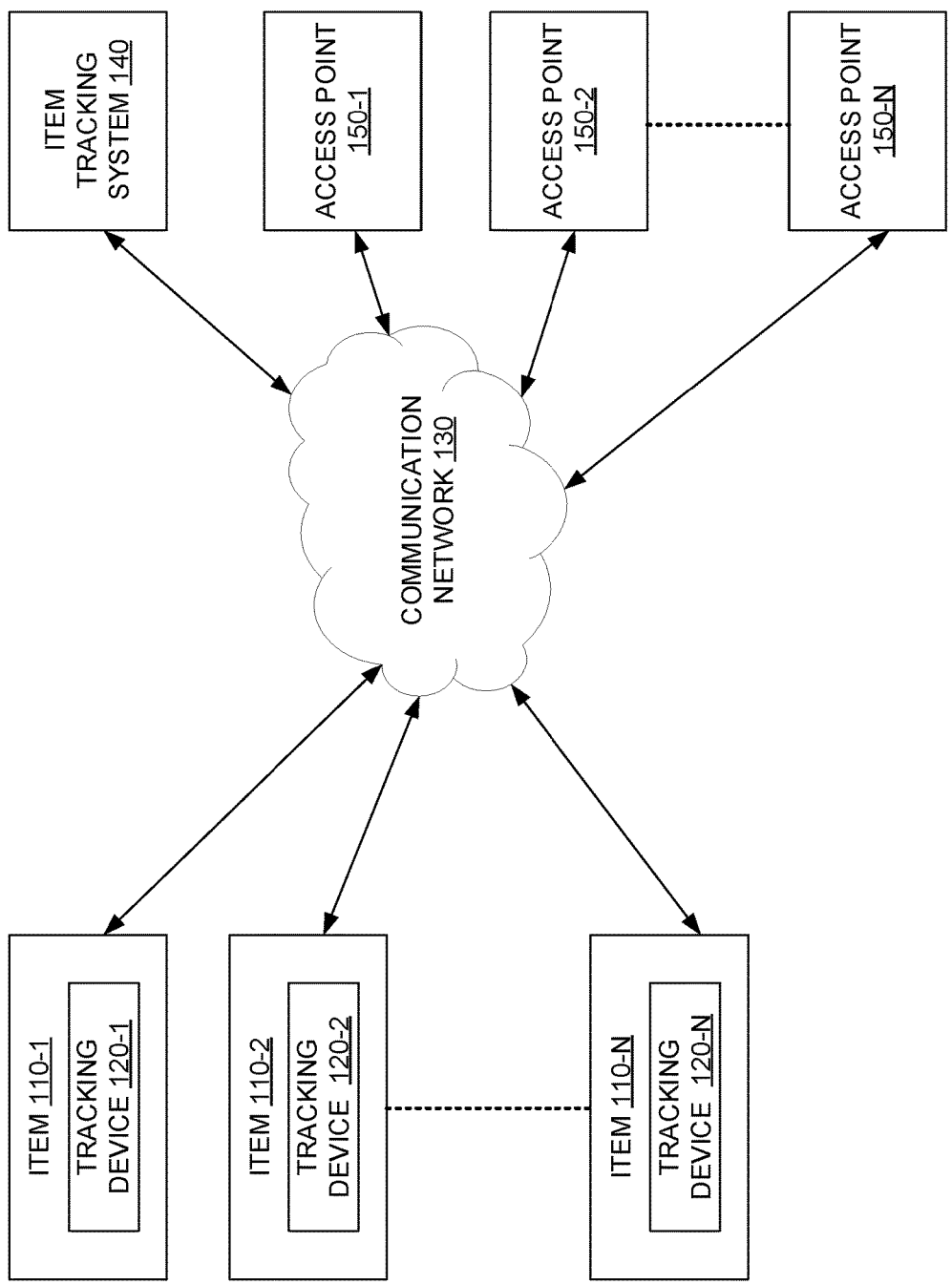
FIG. 1 illustrates, in an example embodiment, a network environment for localizing tracking devices.

Among other benefits and technical effects, embodiments provided herein provide for efficiently determining locations of items, indoors and outdoors, by localizing tracking devices associated with the items. The objects to be tracked may be items or objects stored in warehouses, items provided to various suppliers from a common facility, items that may be moved between multiple facilities, or any item that may be moved within or outside a facility. Examples of items include, but are not limited to, molds for electronic devices and molds for automobile parts. Often times, such items are misplaced or stolen, and therefore, it may be required to track the items to manage the items better. For instance, certain items may be taken from their original position/predefined position to a manufacturing area and may never be returned to their original position. Further, some of these items may be wished to be tracked remotely, for instance, by an item manufacturer, who provides the items to various suppliers. However, traditional approaches either do not provide remote tracking or may provide limited information, such as whether or not, the item is in the indoor facility, and may fail to provide details pertaining to location of the item in the indoor facility. Further, available approaches may fail to track, when the item is moved between multiple facilities. Moreover, certain times, for indoor tracking, fingerprint maps or facility layout may not be available, thereby making tracking complex and error prone.

According to an aspect of present subject matter, a tracking device may be associated with an item to be tracked. The tracking device may provide data, which may be used for localizing the item in an indoor location and an outdoor location. The tracking device may periodically provide satellite based data, such as Global Positioning Satellite (GPS) data to provide details pertaining to the outdoor location of the tracking device and hence the item. In an example, the tracking device may provide the satellite based data to a remote computing device, such as a cloud server. Further, based on the satellite based data, the tracking device may also ascertain whether the tracking device is an indoor location or an outdoor location with respect to an indoor facility. For instance, when the noise/disturbance in the GPS data is greater than threshold, it may be determined that the tracking device is indoors. In another example, connectivity to an access point of an indoor facility may be used to identify a location state of the tracking device. In the indoor location state, the tracking device may activate one or more sensors, such as wireless signal sensing devices, a wireless signal strength sensor, a wireless signal connectivity sensor, an inertial sensor, a magnetic field sensor, a barometric sensor and an ambient lighting sensor, and temperature sensor.

Further, once in the indoor facility, the tracking device may broadcast a wireless signal to other tracking devices within a predefined distance from the tracking device in the indoor facility. Likewise, other tracking devices may also broadcast wireless signals, which may be received by the tracking device in consideration. For indoor localization, the tracking device may provide indoor localization data, which may include signal data and sensor data, to an access point in the indoor facility. The sensor data may include, for instance, inertial data and ambient environment data (pressure, temperature, light, etc.). The signal data includes data pertaining to the received signals, such as signal strength of a signal received from the tracking device. Additionally, the tracking device may also provide associated historical data, the historical data indicating device motion data over a period of time, for example, for how long the tracking device has been stationary.

The indoor facility may include multiple access points, each access point communicates with each other, the tracking device and the remote computing device. The access point may also periodically broadcast a pilot signal to other access points in the indoor facility to form a self-organizing network. The access point may receive the pilot signal broadcasted by other access points and provide signal data pertaining to received pilot signals to the remote computing device. The access point may also provide sensor data associated with the access point to the remote computing device, which may localize the access point using the sensor data and the signal data, collectively referred to as access point localization data.

The access point may also receive the signal data, the sensor data, and the historical data received from tracking devices in vicinity. The access point may process, for each tracking device, the received data and provide to the remote computing device. The data, corresponding to each tracking device may be provided to the remote computing device for further processing and localizing the tracking devices. The relative position of other tracking devices may aid in determining the position of a current tracking device The remote computing device, based on the indoor localization data and the access point localization data received from the access points, may localize the tracking devices and the access points in the indoor facility. For instance, the remote computing device may perform data fusion and estimate location using a modified pathloss exponent model. When outdoors, the tracking device may directly provide satellite based data to the remote computing device for localization. This way items may be tracked efficiently in indoors as well as outdoors and with substantial accuracy. Further, even if the items are moved between multiple facilities, the items still may be tracked to determine the facility to which they are moved to. Moreover, a location of the item inside the indoor facility may also be determined, for instance, a floor, an aisle, and a unit holding the item. Thus, the present subject matter provides for intelligently monitoring the item in real-time, indoor or outdoor. As each indoor facility's floor map and fingerprint data may not be available, using the information pertaining to access points and relative signal data, a tracking device may be localized.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of mobile devices, including processor and memory resources. For example, one or more embodiments described herein may be implemented, in whole or in part, on mobile devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Provided herein is a computer implemented method for controlling power to a display of a mobile device for optimizing power consumption in the mobile device. The method includes identifying a location state of the tracking device as one of an indoor location and an outdoor location relative to an indoor facility, based on at least one of satellite based data and connectivity to an access point in the indoor facility; upon identifying the location state as the indoor location, activating a wireless transceiver and one or more sensor devices, the sensor devices including at least one of a wireless signal strength sensor, a wireless signal connectivity sensor, an inertial sensor, a magnetic field sensor, a barometric sensor, and an ambient light sensor; and providing indoor localization data gathered by sensor devices, the data comprising at least one of signal data and sensor data, the signal data comprising data pertaining to broadcast signals received from one or more other tracking devices within a predetermined distance from the tracking device and the sensor data comprising at least one of inertial data and ambient environment data, the indoor localization data being used for localization.

In an example, the method further includes providing historical data associated with the tracking device, the historical data being indictive of a motion history of the tracking device, and wherein localization is based on the historical data. In another example, the method comprises periodically broadcasting short range wireless signals to one or more other tracking devices within the predetermined distance in the indoor facility, and wherein the tracking device receives short range wireless signals broadcasted by the one or more other tracking devices. Further, in one example, localization of the tracking device is based on a position estimate of at least one other tracking device, from among the one or more other tracking devices, in the indoor facility having a known location relative to the tracking device.

A tracking device for localizing an item is also provided. The tracking device includes a processor and a memory storing a set of instructions. The instructions are executable in the processor to identify a location state of the tracking device as one of an indoor location and an outdoor location relative to an indoor facility, based on at least one of satellite based data and connectivity to an access point in the indoor facility; upon identifying the location state as the indoor location, activate a wireless transceiver and one or more sensor devices, the sensor devices including at least one of a wireless signal strength sensor, a wireless signal connectivity sensor, an inertial sensor, a magnetic field sensor, a barometric sensor, and an ambient light sensor; and provide indoor localization data gathered by sensor devices, the data comprising at least one of signal data and sensor data, the signal data comprising data pertaining to broadcast signals received from one or more other tracking devices within a predetermined distance from the tracking device and the sensor data comprising at least one of inertial data and ambient environment data, the indoor localization data being used for localization.

An item tracking system for localizing an item is also provided. The item tracking system includes a processor and a memory storing a set of instructions. The instructions are executable in the processor to receive, from a tracking device, satellite based data indicative of an outdoor location of the tracking device; identify a location state of the tracking device as one of an indoor location and the outdoor location with respect to an indoor facility, based on the satellite based data and connectivity to an access point of the indoor facility; receive, from the access point, indoor localization data pertaining to the tracking device, when the tracking device is in the indoor location state, the indoor localization data comprising at least one of signal data and sensor data, the signal data including information pertaining to wireless signal received from other tracking devices within a predetermined distance from the tracking device and sensor data includes one of inertial data and ambient environment data; localize the tracking device in the indoor facility, based on the indoor localization data and at least one of a position of the access point in the indoor facility and a position of another tracking device in the indoor facility; and provide data pertaining to localization to a user for monitoring the tracking device.

In an example, the instructions are executable in the processor are also to associate, upon localizing the tracking device, a confidence factor with a location estimate of the tracking device, based on historical data associated with the tracking device.

In another example, the instructions are executable in the processor are also to provide a synchronizing input to each of access points in the indoor facility, wherein each of the access points broadcast a pilot signal, based on the synchronizing input, and wherein the item tracking system determines a position of each of the access points, based on broadcasted pilot signals.

SYSTEM DESCRIPTION

FIG. 1 illustrates, in an example embodiment, a network environment 100 for tracking items 110-1, 110-2, . . . 110-N indoor and outdoor. The items 110 may be manufactured in one facility and from there may be moved to other facilities. In an example, on leaving the facility, say, the base facility, the items 110 may be tracked via the corresponding tracking devices 120-1, 120-2, . . . 120-N. The items 110-1, 110-2, . . . 110-N and the tracking devices 120-1, 120-2, . . . 120-N may collectively referred to as items 110 and tracking devices 120, and individually, referred to as item 110 and tracking device 120. In an example, the tracking device 120 may be embedded in the item 110. In other example, the tracking device 120 may be coupled to the item 110, for instance, provided on a surface of the item 110. Further, each tracking device 120 may have a unique ID associated with it to identify the tracking device 120.

The tracking device 120 may communicate over a communication network 130 with an item tracking system 140, and one or more access points 150-1, 150-2, . . . 150-N, collectively referred to as access points 150. The communication network 130 may be a wireless communication network, such as a cellular network, The communication network 130, in an example, may be a wireless communication network, such as, a telecommunication network, a cellular network, a wireless local area network (WLAN), a satellite communication based network, a near field communication based network, etc.

The item tracking system 140 may be remote computing device, such as a cloud server, to provide remote management of the items 110. In other examples, the tracking devices 120 may communicate with each other, the item tracking system 140, and the access points 150 over the communication network 130. In an example, each tracking device 120 may be activated, when leaving the base facility. The tracking devices 120 may provide data, sensor and/or signal, to the access points 150 and the item tracking system 140 for localization as is explained in detail in subsequent paragraphs.

The device position and localization refer to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms.

Figure 2:
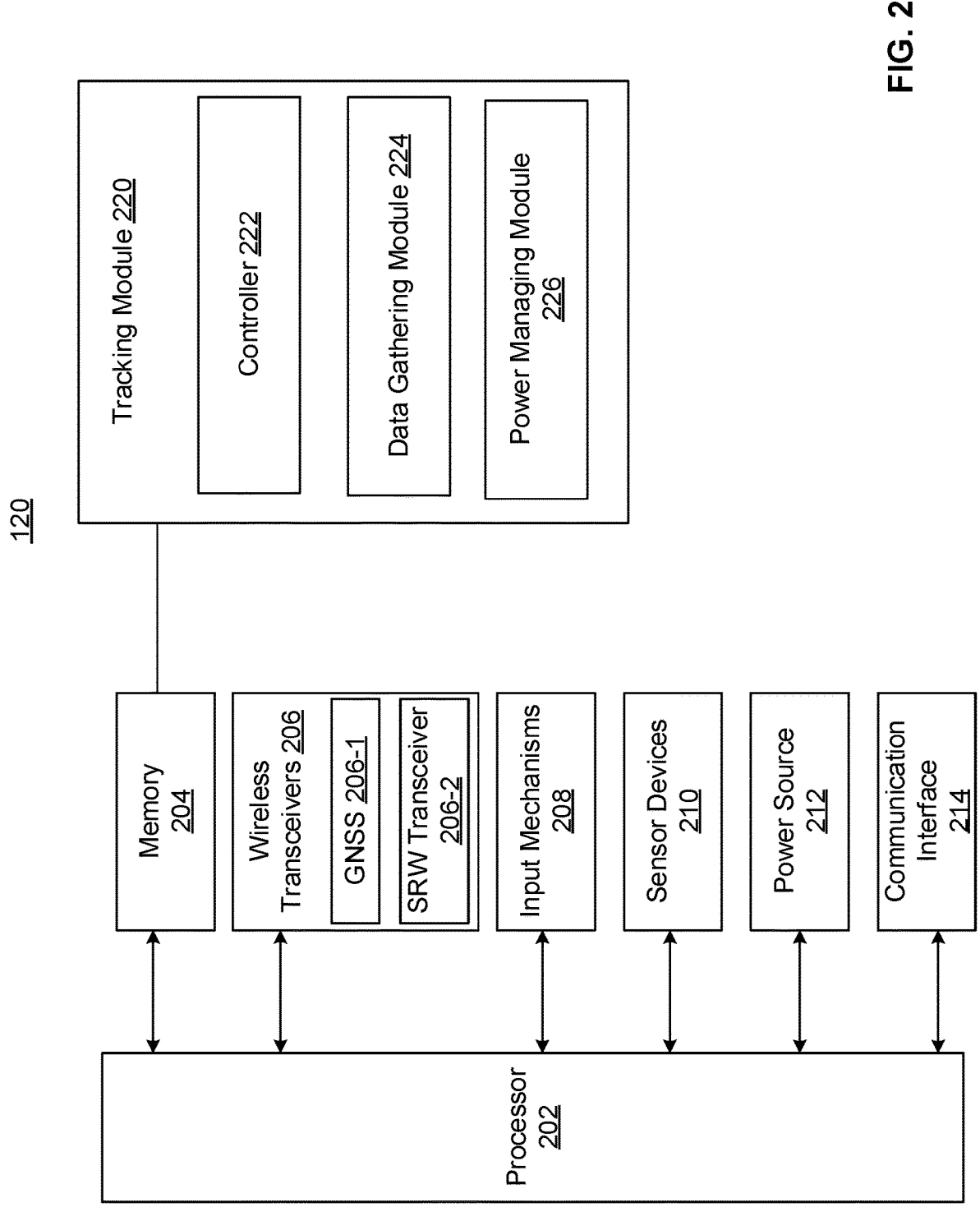
FIG. 2, FIG. 3, and FIG. 4 illustrate example architectures of a tracking device, an access point device, and a tracking system, respectively.

FIG. 2a illustrates, in an example embodiment, the tracking device 120 associated with the item 110. In one embodiment, the tracking device 120 may correspond to, for example, a semi-conductor chip, which may be associated with the item. The tracking device 120 may include processor(s) 202, memory 204, wireless transceivers 206, input mechanisms 208, such as, such as a keypad or software-implemented touchscreen input functionality, barcode, QR code or other symbol- or code-scanner input functionality, sensor devices 210, a power source 212, and a communication interface 214. The wireless transceivers 206 may include, for example, global navigation satellite system (GNSS) 206-1 and short range wireless (SRW) transceivers 206-2, such as Bluetooth transceiver. In other examples, other transceivers, such as cellular transceivers may be also implemented. The power source 212 may provide power to various components of the tracking device 120. The power source 212 may be a rechargeable battery, one time use battery, or any other power source thereof. The sensor devices 210 may include a wireless signal strength sensor, a wireless signal connectivity sensor, an inertial sensor, such as accelerometer, gyroscope, a magnetic field sensor, a barometric sensor and an ambient lighting sensor, and temperature sensor.

The tracking device 120, among other components, may include a tracking module 220. The tracking module 220 may include processor-executable instructions stored in RAM, in one embodiment, in the memory 204, and include as sub-modules, such as a controller 222, a data gathering module 224, and a power managing module 226.

In an example, to initiate tracking of the item 110 corresponding tracking device 120 may be activated, for instance, by providing a control trigger to the controller 222 to initiate tracking. Upon activation, the tracking device 120 may periodically scan and obtain satellite-based data, such as GNSS data obtained by the GNSS 206-1. The satellite based data may be provided to a remote computing device, such as the item tracking system 140 so that the item 110 may be tracked outdoors. Further, based on the satellite based data it may be ascertained whether the tracking device is indoors or outdoors, an indoor facility being a fully enclosed or at least a partially enclosed facility.

The indoor/outdoor detection may be based on periodic scanning of satellite based data and processing of estimated location and standard deviation associated with the estimated location. For instance, if the satellite based data includes noise and disturbances greater than a threshold, the tracking device may be ascertained to be in an indoor location state, where generally satellite based localization may be constrained. In an example, the controller 222 may ascertain whether the tracking device 120 is at an indoor location, based on the satellite data and/or predefined pinned indoor locations. For instance, based on the satellite based data, it is determined that the tracking device 120 has reached one of the pinned indoor location, it may be ascertained that the tracking device 120 is indoor.

In another example, connectivity to an access point may be used to identify a location state. For instance, if the access points 150 are deployed, the access points 150 can also be used for indoor/outdoor processing, as well as measurements of WiFi and cellular signal strength. In yet another example, when the tracking device 120 detects an access point 150 it may be determined that the tracking device 120 is indoors. Likewise, in case no access point 150 is detected in vicinity, it may be determined that the tracking device 120 is outdoor.

It will be appreciated that, generally, in an indoor facility, such as a warehouse, manufacturing unit, or a storage unit, multiple items 110 may be stored, which may be stationary or moved from one to unit to another when required. In an example, using relative positions of the items 110, i.e., the tracking devices 120, position of a tracking device may be determined.

In an example, on ascertaining that the tracking device 120 is indoor, the controller 220 may activate the sensor devices 210, provide trigger to the wireless transceiver 206, such as the SRW transceiver 206-2, and connect to an access point 150, for instance, the nearest access point. For instance, the tracking devices 120 may send out pilot signals when no access point 150 is connected until a connection is established with the access point 150.

Further, upon activation, the sensor devices 210 and the wireless devices may start gathering data to provide for indoor localization. In an example, the SRW transceiver 206-2 may broadcast a wireless signal, such as a Bluetooth low energy (BLE) signal to other tracking devices 120 in the range of the current tracking device 120. Likewise, the other tracking devices 120 may also periodically transmit a wireless signal, which may be received by the current tracking device 120. In an example, the data gathering module 224 may gather signal data, such as measured signal strength of each of the received wireless signal using sensors employed for measuring signal strengths. Further, data pertaining to each received signal may also be tagged or mapped to corresponding tracking device 120 to identify source of the wireless signal, for instance, by way for tracking device ID associated with each of the tracking device 120. The signal data may be provided to another computing device, such as the access point 150 to aid in localization using, for instance, short range wireless transmission. The measured signal strength may be used to estimate relative distances between the current tracking device 120 and other tracking devices 120 in the vicinity.

In addition to signal data, the data gathering module 224 may also gather sensor data from various other sensor devices 210. The sensor devices 210 may provide details pertaining to the device's motion history, based on inputs from the inertial sensors, pressure related inputs, temperature related inputs. For instance, inputs from the accelerometer and the gyroscope may help in determining whether the tracking device 120 is stationary or is moving. In another example, data from the magnetometer/gyroscope in addition to the accelerometer can be used to infer the path the tracking device 120 has traversed. This can be cross-referenced with the access point signal measurements to increase the confidence in the estimated location. Additionally, when the access points are not deployed, inertial data can still provide some rough estimate of location within the indoor facility. For instance, inertial data may be fused with rough GPS/mesh networks based data for localization.

The ambient environmental data, such as pressure and temperature data may help in further fine tuning the position of the current tracking device 120. For instance, pressure/temperature may be used to determine elevation. For a given temperature, change in pressure may be used to determine change in height, which may be used for determining elevation, for instance, floor on which the current tracking device 120 is.

Thus, the data gathering module 224 may periodically or when triggered may provide indoor localization data comprising the signal data and the sensor data to the access point 150 for continuous real-time tracking of the item 110 associated with the tracking device 120.

In an example, for efficient power usage, the tracking module 220 may also include a power managing module 226, which may aid power optimization. For instance, the power managing module 226 may initiate a low power mode for the tracking device 120, based on a low power mode input received from the access point 150, which may receive it from the item tracking system 140 as will be explained in detail later in the description. For instance, on ascertaining that the current tracking device 120 has been appropriately determined and the tracking device 120 has been stationary for a predetermined period of time, an input may be provided to the tracking device 120 to enter a low power mode. On receiving the input indicating to enter the low power mode, the power managing module 226 may suspend processing required for localization of the current tracking device 120. For instance, gathering and sharing of indoor location data with the access point may be suspended. However, in the low power mode, the current tracking device 120 may still continue to broadcast the wireless signal periodically to aid localization of other tracking devices but may suspend listening/receiving of the wireless signals. Further, an inertial sensor, such as the accelerometer may still be active to detect when the tracking device is no longer stationary.

The power managing module 226 may exit the low power mode, if it is determined that the tracking device 120 has started to move or is no longer stationary. For instance, data from the accelerometer may be analyzed to determine whether the tracking device is stationary or not. On determining that the tracking device 120 is no longer stationary, the tracking device 120 may exit the low power mode to re-enable the processing required for localization. This way, the power source 212 may be used efficiently.

Further, to ensure that the tracking devices 120 have sufficient power to operate, the power management module 226 may be required to periodically check-in with at least one of the access point 150 and the item tracking system 140 to ensure that they still have operation power. Each tracking device 120 may self-report their battery power levels which can trigger a system flag for low-battery power to ensure replacement of batteries prior to the battery dying. As well, if the tracking device 120 fails to check-in within the predefined period, this may be considered an indication of potential tampering or battery failure which can be signaled to an operator.

Figure 3:
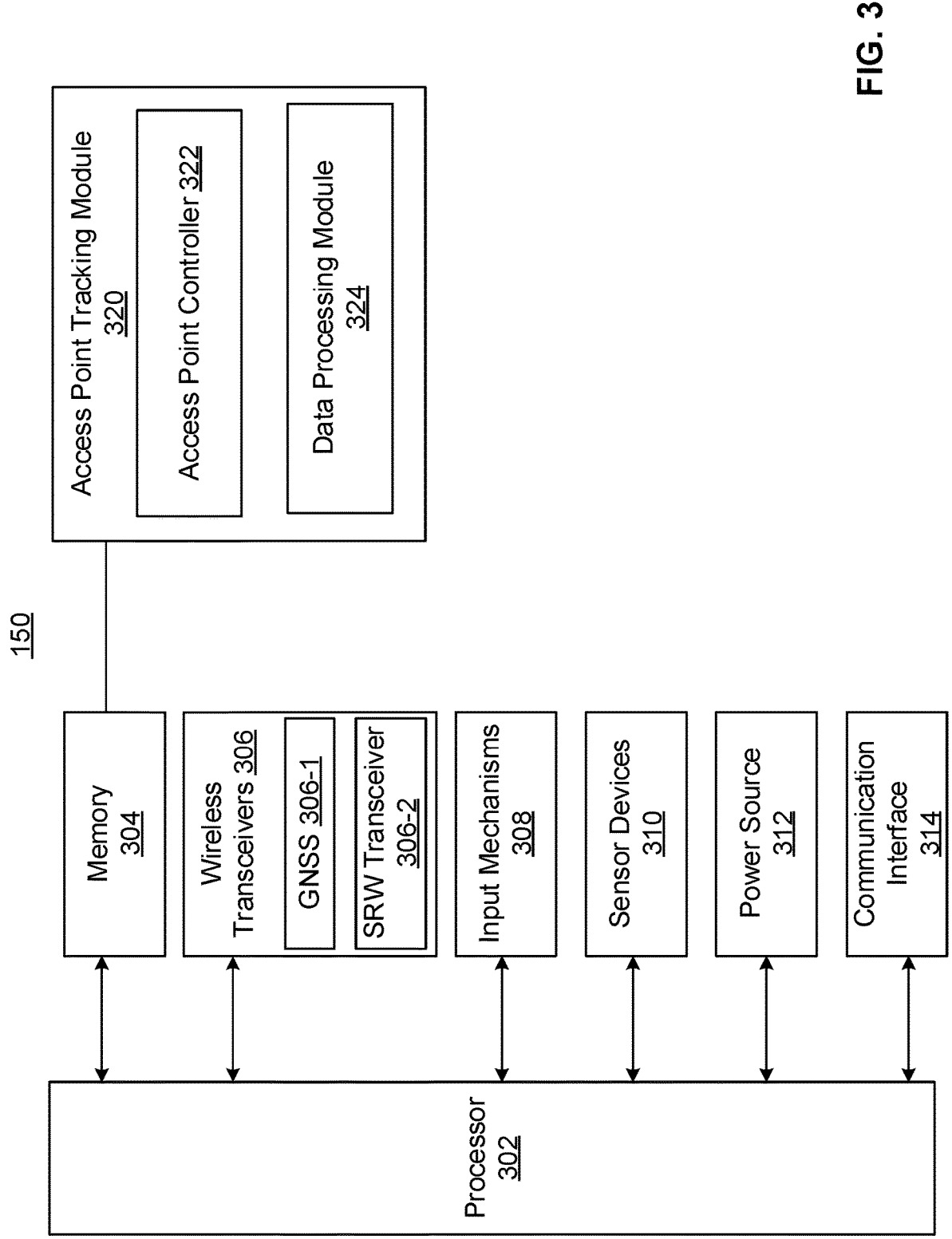

FIG. 3 illustrates, in an example embodiment, the access point 150. The access point 150 may communicate with the tracking devices 120 and the item tracking system 140. The access point 150 may include processor(s) 302, memory 304, wireless transceivers 306, input mechanisms 308, such as, such as a keypad or software-implemented touchscreen input functionality, barcode, QR code or other symbol- or code-scanner input functionality, sensor devices 310, a power source 312, and a communication interface The wireless transceivers 306 may include, for example, global navigation satellite system (GNSS) 306-1 and short range wireless (SRW) transceivers 306-2, such as Bluetooth transceiver or Wi-Fi transceiver. In other examples, other transceivers, such as cellular transceivers may be also implemented. The power source 312 may provide power to various components of the access point 150. The sensor devices 310 may include barometric or other environmental pressure sensing functionality and temperature sensors.

The access point 150, among other components, may include an access point tracking module 320. The access point tracking module 320 may include processor-executable instructions stored in RAM, in one embodiment, in the memory 304, and include as sub-modules, such as an access point controller 322 and a data processing module 324.

In an example, an indoor facility may include multiple access points 150, based on a size of the indoor facility. In an example, the indoor facility may include at least three access points 150 to assist with transmission of data to the item tracking system 140. The access points 150 may be spread across the indoor facility to ensure that facility appropriately covered. When indoors, the tracking devices 120 may communicate with the access points 150, which in turn may communicate with the item tracking system 140, as compared to, when the tracking device 120 is outdoor, where it may communicate directly with the tracking system 140.

In an example, deployment locations of the access points 150 may not be known in the indoor facility. The access points may form a self-organizing network, where the access points 150, like the tracking devices 120, may periodically broadcast pilot signals to other access points 150 in the vicinity. Thus, the access points 150 may communicate with each-other to estimate critical system parameters, such as wireless pathloss exponent and constants. The critical system parameters may help gain an insight into the wireless environment, which can then assist in localizing devices within the environment. Alternatively, the processing of data to estimate the critical system petameters may be done by the item tracking system 140. Such an analysis of the critical system parameters, can help alleviating the burden of perfectly placing access points as a system (including access points) can adapt and learn, thereby forming a self organizing network.

To communicate, the access points 150 may broadcast pilot signals to each-other. For broadcasting, server-side time-based synchronization is utilized to ensure simultaneous periodical transmission/reception intervals, in which each access point 150 may take turns broadcasting a pilot signal which are measured by the surrounding access points 150. The access point controllers 322 may feed back the measured signal data to the item tracking system 140 for additional processing.

The signal data may also include absolute location estimates and relative location estimates. The absolute location estimates may come from GPS/cellular measurements and possibly approximate knowledge of where they were deployed. The relative location estimates are measurements with respect to one access point 150 to another access point 150. The relative measurements may be used to determine distance between two access points 150, for instance it may be determined that two given access points 150 should be 40 meters apart, approximately. In case the determined distance coincides with the absolute location estimate, higher is the confidence that the absolute location estimate is correct. In an example, various optimizations may be performed to refine the absolute location estimates based on the relative location estimates. For instance, optimization techniques, such as non-linear least squares, Kalman filtering, and Procrustes analysis may be performed.

This process is performed at deployment-stage and may be repeated periodically to confirm that the deployment has not changed, if changed, the controller 322 may trigger full access point localization method. The localization of the access-point may be performed at the item tracking system 140. On ascertaining that the deployment may have changed, the item tracking system 140 may provide an input to the access point 150 to trigger the access point localization, where the signal data and sensor data may be gathered again. In other examples, the access point 150 may perform the localization. In an example, the localization method may also estimate the pathloss channel exponent and constant, which are required for indoor distance estimation of the items 110 as will be explained in detail with reference to description of FIG. 4.

Further, the data processing module 324 may gather data, the signal data and the sensor data from the connected tracking devices 120. For each tracking device 120, the corresponding data may be processed and packed together, and provided to the item tracking system 140 for additional processing. The data processing module 324 may also provide signal data and sensor data pertaining to the access point 150 to the item tracking system 140 for analysis, as explained with respect to description of FIG. 4.

Figure 4:
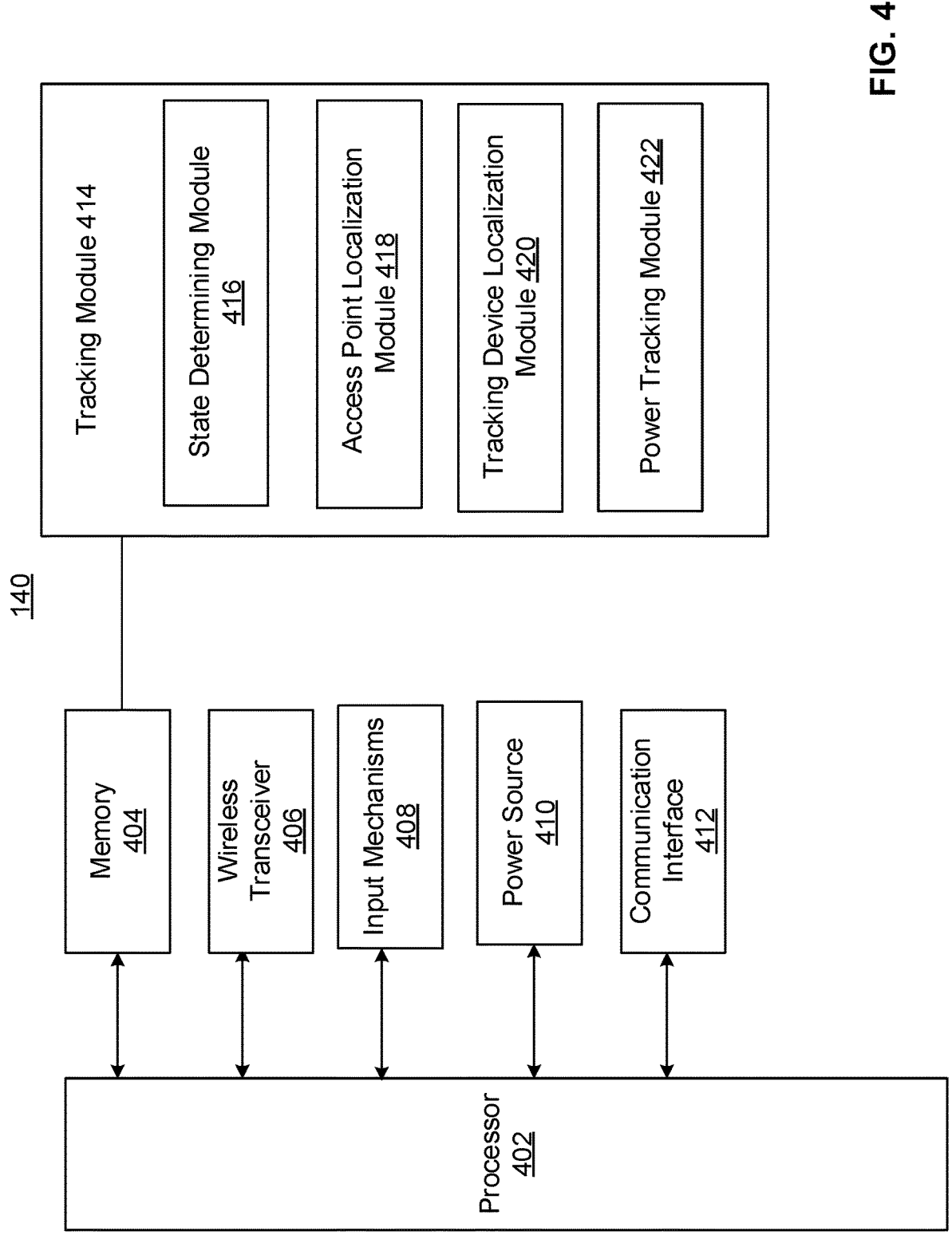

FIG. 4 illustrates, in an example embodiment, the item tracking system 140. The item tracking system 140 may communicate with the tracking devices 120 and the access points 150. The access point 150 may include processor(s) 402, memory 404, wireless transceivers 406, input mechanisms 408, such as a keypad or software-implemented touchscreen input functionality, barcode, QR code or other symbol- or code-scanner input functionality, a power source 410, and a communication interface 412. In other examples, other transceivers, such as cellular transceivers may be also implemented. The power source 410 may provide power to various components of the item tracking system 140.

The item tracking system 140, among other components, may include an item tracking module 414. The item tracking module 414 may include processor-executable instructions stored in RAM, in one embodiment, in the memory 404, and include as sub-modules, such as a state determining module 416, an access point localization module 418, a tracking device localization module 420, and a tracking device power management module 422.

The item tracking system 140 may provided remotely, for instance in a facility separate from the indoor facility having the item 110. However, in other examples, it may be in same facility as well. For instance, the access point functionality may be combined with the functionalities of the item tracking system's. Alternatively, one or more components of the item tracking module 414 may be implemented in the access point 150.

The tracking devices 120 may communicate directly with the item tracking system 140, when outdoors; and may communicate via the access points 150, when in an indoor facility. As mentioned earlier, the access points 150 may provide access point related signal data and tracking devices related data for localizing the access points 150 and the tracking devices 120, respectively. In an example, the access point localization module 418 may receive access point related data from the access points 150, which may aid in localizing the access points 150. The access point related data may include signal data and sensor data pertaining to the access point 150. The signal data may include absolute location measurements (GPS/cellular measurements) and/or relative location measurements (measured signal strength of the other access points data for inferring the locations of the access points). For localization, the access point localization module 418 may provide an input to the access points to have their broadcasting signals synched, for instance, to ensure periodic transmissions/reception intervals, which are in a sequence, where each access point may take turn to broadcast a pilot signal, which in turn is measured by the surrounding access points.

Further, the input to repeat the broadcasting may be provided periodically to confirm that the deployment has not changed. If the deployment changes, so, the full access point localization method may be re-triggered. Based on the access point localization data, the pathloss channel exponent and constant, which are required for indoor distance estimation of the item 110, may also be computed.

In other example, the position of the access points 150 may be known. In said example, the localization may be performed to increase the confidence in the prestored location, which further help in accurately localizing the items 110.

In an example, the localization of the items 110 may be based on whether the items 110 are indoor or outdoor. In an example, the state determining module 416 may identify a location state of the tracking device 120, i.e. may whether the item 110 is indoor or outdoor to localize the item 110 accordingly. For instance, based on the satellite based data indicating information pertaining to an outdoor position of the item 110 (and the tracking device 120), it may be determined whether the item is indoors and outdoors. In an example, the tracking device 120 may periodically provide satellite based data to the item tracking system 140, which in turn based on the satellite based data, determine the outdoor location of the tracking device 120. Further, when outdoors, the state determining module 416 may provide the input to the tracking device localization module 420 to periodically update a position of the item 110 corresponding to the tracking device 120.

However, in case it is determined that the tracking device 120 is an indoor location, the state determining module 416 may provide an input to the tracking device localization module 420 to initiate indoor localization process and the tracking device power management module 422 to efficiently manage power of the tracking device 120. In an example, based on satellite based data, the state determining module 416 may determine that the tracking device 120 is now indoors. In another example, based on connectivity of the tracking device 120 to the access points 150, it may be determined that tracking device 120 is indoors. For instance, when indoors, the access points 150 may provide signal and sensor data corresponding to the connected tracking devices 120 to the item tracking system 140.

To localize the tracking device 120 indoors, the tracking device localization module 420 may process the indoor localization data comprising signal and sensor data pertaining to tracking device, received from the access points 150. As mentioned earlier, each access point 150, for each connected tracking device, may receive signal data indicative of signal strength of neighboring tracking devices 120, and sensor data indicative of inertial data and ambient environment data (temperature, pressure, etc.) associated with the tracking device 120. In an example, the access point may provide signal and sensor data to the item tracking system 140 to perform more rigorous processing to save computation power and time.

In an example, owing to access point connectivity, the tracking device localization module 420, for each access point 150, a current channel state information (CSI) to each item tracking chip may be estimated. The CSI provides a measure of how a signal propagates in an environment and with the estimated CSI and the measured received signal strength, accurate distance propagation information can be inferred, which may provide higher quality distance estimates than typical RSS-based estimation.

In an example, the tracking device localization module 420 may estimate the distance of connected tracking devices 120 from the access point 150 using classical pathloss models. For higher distance accuracy, in one example, estimation may be done by comparing frequency-domain received power, which may be obtained by transferring received signal to the frequency domain. Further, a pathloss exponent model may be modified to incorporate the estimated CSI to compensate for the current channel conditions, which may exploit frequency diversity to reduce the effects of small-scale fading and to provide more robust distance estimates. Each distance estimate may also include an estimated error, which is a function of the estimated CSI and measured signal variance.

The tracking device localization module 420 using the set of distance estimates, which are based on a single tracker's measurement of distance towards multiple access points, may determine an estimated location and a confidence, which may be indicated by way of standard deviation. For instance, the tracking device localization module 420 may implement a weighted trilateration scheme, which can provide both an estimated location and a standard deviation. The standard deviation may provide for fusing the instantaneous data with historical data to better refine the location estimate.

In an example, based on the sensor data, for instance, inertial data, which can provide information about the relative movements of the tracking device 120, the tracking device localization module 420 may ascertain whether the tracking device is stationary, which may often be the case in a warehouse. When stationary for a predetermined time-period, additional averaging may be performed to reduce effects of noise and slowly/dynamically an estimated location of the tracking device 120 may be slowly and dynamically updated. Further, as mentioned above, data from magnetometer or gyroscope in addition to the accelerometer can be used to infer the path the tracking device 120 has traversed. This can be cross-referenced with the access point signal measurements to increase the confidence in the estimated location. Moreover, when the access points are not deployed, inertial data may provide some rough estimate of location of the tracking device 120 within the indoor facility. For instance, inertial data may be fused with rough GPS/mesh networks based data for localization.

In addition to inertial data, for determining a confidence factor, historical data may be used. Using the historical data associated with the tracking device, a time period for which the tracking device 120 has been stationary may be determined. Based on the determined time-period for which the item 100 has been stationary, a confidence factor may be associated the determined position. Owing to wireless signal strength based (such as BLE based) relative measurements between the tracking devices, when some items have strong confidence in their location (e.g., have been stationary for a while) they can provide more meaningful information to neighboring items. This is reflected in the weighted location-based estimates from the BLE-relative measurements. The weighting may be representative of the confidence. Since, the location is being computed continuously and based on the current wireless signal data (which can vary greatly), at times the location estimate may be determined with higher confidence as compared certain other times. So, higher the confidence, that location estimate gets a higher weight. For the items 110 (and thus the tracking devices 120) which are in motion and/or stationary with low confidence in their location, for localization, the tracking device localization module 420 can rely more heavily on nearby items 110 (which may have higher confidence/weight) while they stabilize their location estimates.

For battery efficiency, once the confidence factor associated with the position of the item 110/tracking device 120 is greater than threshold, the tracking device power management module 422 may provide an input to the corresponding tracking device 120 to enter in the low power mode, where the wireless transmission can be suspended and a low-power motion detection is activated. In said mode, the tracking device 120 may still periodically broadcast, such as signals to other nearby tracking devices 120 to assist others devices 120 in positioning but the tracking device 120 in low power mode may no longer be listening. Additionally, the tracking device 120 in low power mode, by way of inertial sensors, may identify if the tracking device 120 has started to move or not. If the tracking device 120 is determined to be no longer stationary, then the tracking device 120 may re-enable all processing to localize itself and providing a corresponding input to the access point 150, which in turn is communicating with the item tracking system 140.

Further, the tracking device power management module 422 may also receive power related related information from the tracking devices 120 to identify the tracking devices 120 that may be tampered, low on battery, or have sufficient battery.

The item tracking system 140 may display all the above data on a web application for easy maintenance and searching for items, etc. The item tracking system 140 may automatically notify technicians of precise locations and items which need battery replacements.

METHODOLOGY

Figure 5:
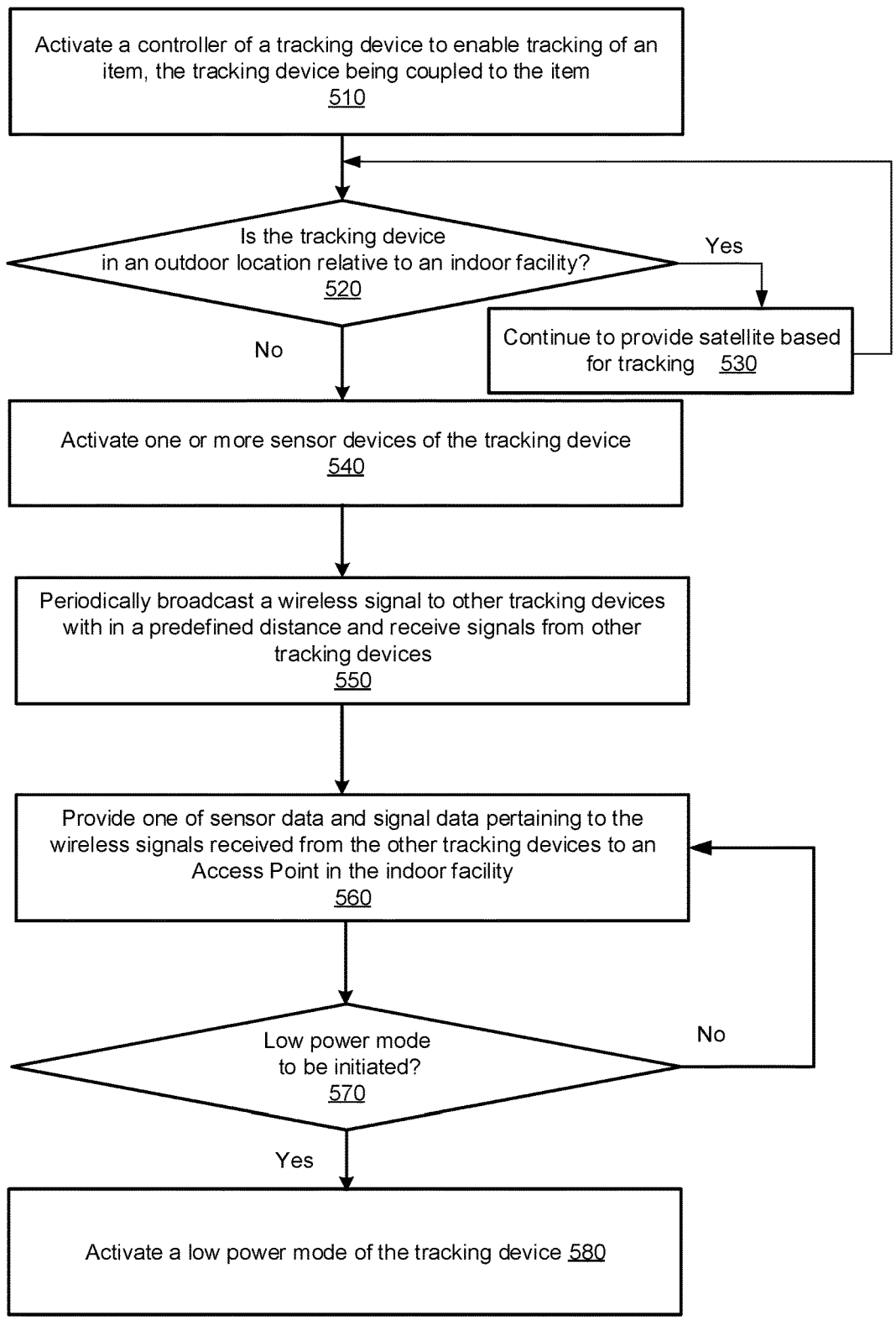
FIG. 5 illustrates, in an example embodiment, a method of providing tracking data associated with the tracking device.
Figure 6:
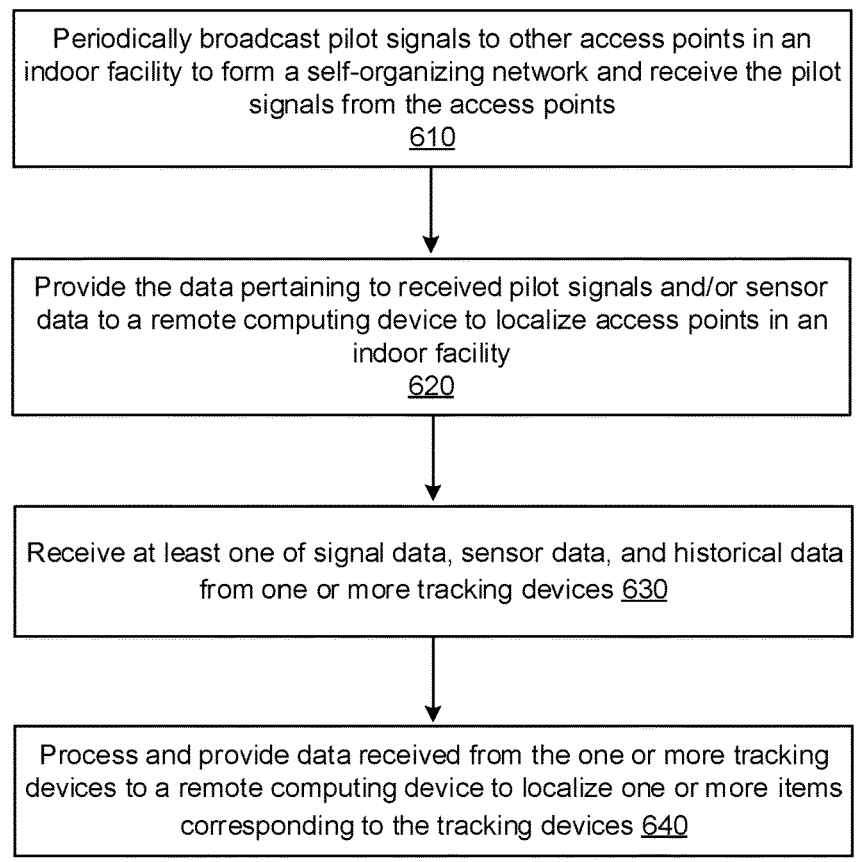
FIG. 6 illustrates, in an example embodiment, a method of gathering data by the access point for localizing the tracking device and the access point.
Figure 7:
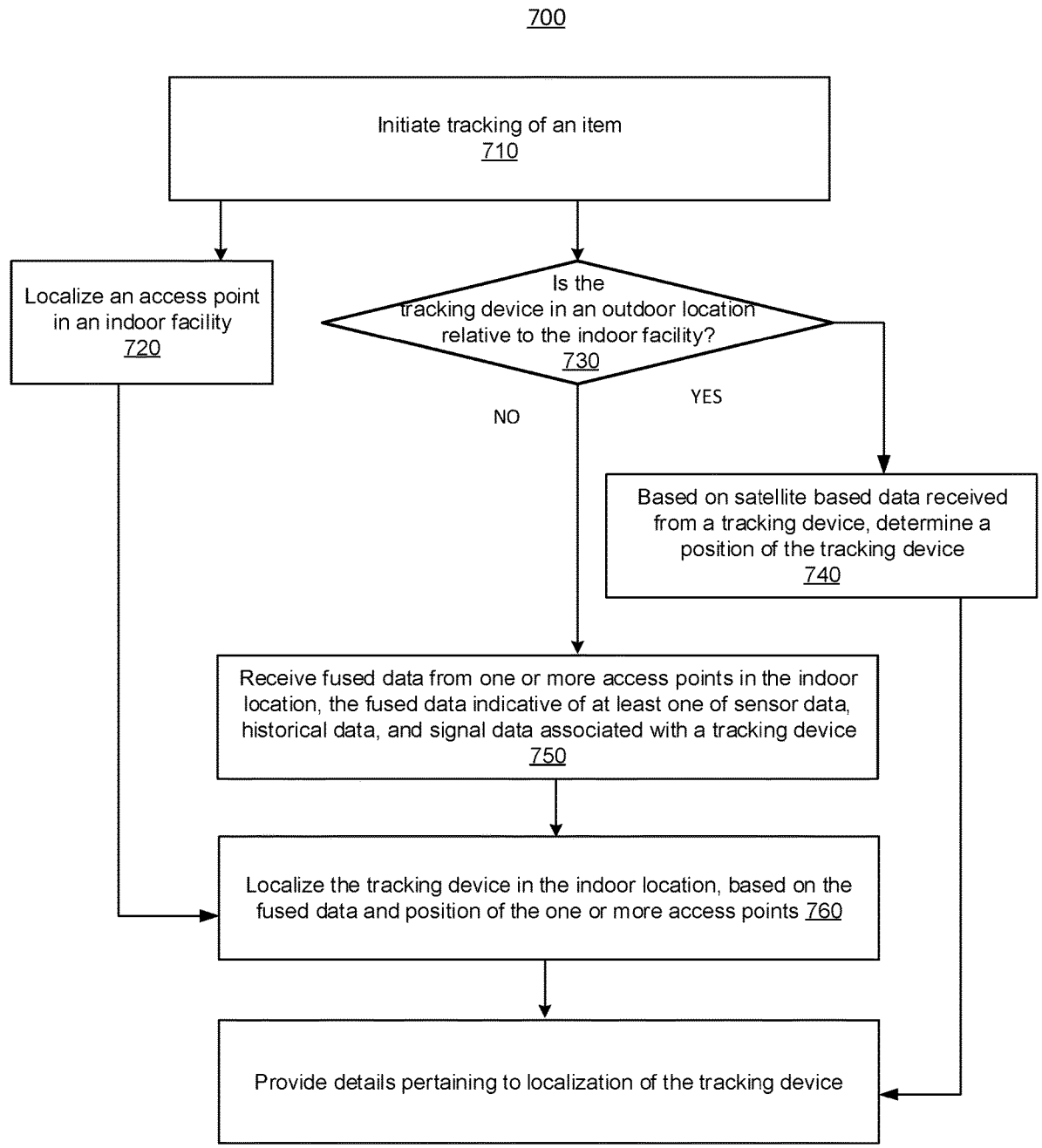
FIG. 7 illustrates, in an example embodiment, a method of localizing the tracking device and the access point.

FIG. 5 illustrates, in an example embodiment, a method 500 of providing data associated with the tracking device for localization. FIG. 6 illustrates, in an example embodiment, a method 600 of data processing performed by an access point. FIG. 7 illustrates, in an example embodiment, a method 700 of localizing an item associated with the tracking device. In describing examples of FIG. 5-FIG. 7, reference is made to the examples of FIGS. 1-4 for purposes of illustrating suitable components or elements for performing a step or sub-step being described.

It will be appreciated that some of the method steps may be deleted, modified, or more steps may be added. Also, the steps are not limited by the order in which they are performed. Some of the steps may be performed simultaneously as well.

Referring to FIG. 5, examples of method steps described herein are related to the use of the tracking device 120. According to one embodiment, the techniques are performed the processor 202 executing one or more sequences of software logic instructions that constitute the tracking module 220 of the tracking device 120. In embodiments, the tracking module 220 may include the one or more sequences of instructions within sub-modules including a controller 222, a data gathering module 224, and a power managing module 226. Such instructions may be read into the memory 204 from machine-readable medium, such as memory storage devices. Execution of the sequences of instructions contained in the controller 222, the data gathering module 224, and the power managing module 226 in the memory 204 causes the processor 202 to perform the process steps described herein. It is contemplated that, in some implementations, some of the sub-modules, or any other portions of executable instructions constituting the tracking module 220 may be hosted at a remote device rather than the tracking device 120. In alternative implementations, at least some hard-wired circuitry may be used in place of, or in combination with, the software logic instructions to implement examples described herein. Thus, the examples described herein are not limited to any particular combination of hardware circuitry and software instructions.

At block 510, a controller, such as the controller 222 of the tracking device may be activated to enable tracking of an item, the tracking device being associated with the item. In an example, the controller may be activated on receiving an initiation input, for instance, when the item is to be localized.

At block 520, it may be ascertained, whether the tracking device is an indoor location relative to an indoor facility. For instance, based on satellite based data, predefined indoor locations, or connectivity an access point, it may be ascertained whether the tracking device is indoor or outdoor. If at block 520 a location state of the tracking device is identified. For instance, it may be ascertained whether the tracking device is outdoors with respect to an indoor facility or indoors. In case the location state is outdoor, the method 500 may proceed to block 530, where localization using satellite based data, such as GPS data or GNSS data may be continued. However, if at block 520 is ascertained that the tracking device is indoor, the method 500 may proceed to block 540, where one or more sensor devices, such as inertial sensors, pressure sensors, temperature sensors, etc., and transceivers, such as a Bluetooth transceiver may be activated for gathering data.

At block 550, the tracking device may periodically broadcast a wireless signal to other tracking devices within a predefined distance, and receive wireless signals broadcasted by other tracking devices.

At block 560, data pertaining to the wireless signals, such as signal strength, received from other tracking devices and sensor data may be provided, to an access point, for instance, to the nearest access point, which upon required processing may provide the data to a remote device, such as the item tracking system 140 for localization. In an example, historical data associated with the tracking device may also be provided to the access point.

At block 570, it is ascertained, whether a low power mode is to be initiated, based on an input received from the remote device. The low power mode may be initiated, when a confidence factor associated with the position of the tracking device is greater than a threshold. The confidence factor may be based on a time period for which the tracking device has been stationary.

If at block 570, it is ascertained that the low power mode is not be initiated, the sensor data and the signal may be continuously collected as explained above. However, if at block 570, it is ascertained that the low power mode is to be initiated, the method 500 may proceed to block 580. At block 580, listening of wireless signals may be suspended, while the tracking device 120 may still broadcast signals periodically to assist other tracking devices in localization. Further, the tracking device in low power mode, by way of inertial sensors, may identify if the tracking device has started to move or not so that the low power mode may be suspended, when the tracking device is no longer stationary to track the tracking device.

Referring to FIG. 6, examples of method steps described herein are related to the use of the access point 150. According to one embodiment, the techniques are performed the processor 302 executing one or more sequences of software logic instructions that constitute the access point tracking module of the access point 150. In embodiments, the tracking module 320 may include the one or more sequences of instructions within sub-modules including an access point controller 322 and a data processing module 324. Such instructions may be read into the memory 304 from machine-readable medium, such as memory storage devices. Execution of the sequences of instructions contained in the access point controller 322 and the data processing module 324 in the memory 304 causes the processor 302 to perform the process steps described herein. It is contemplated that, in some implementations, some of the sub-modules, or any other portions of executable instructions constituting the access point tracking module 320 may be hosted at a remote device rather than the access point 150. In alternative implementations, at least some hard-wired circuitry may be used in place of, or in combination with, the software logic instructions to implement examples described herein. Thus, the examples described herein are not limited to any particular combination of hardware circuitry and software instructions.

At step 610, wireless pilot signals may be broadcasted to other access points in the indoor facility to form a self organizing network. Further, the pilot signal from other access points may be received. In an example, the broadcast signals from the access points in the indoor facility may be time-synced so that the access points broadcast in a sequential manner.

At block 620, data pertaining to received pilot signals, such as signal strength, and sensor data, such as data pertaining to ambient environment (pressure and temperature) associated with the access point may be provided to a remote computing device to localize the access point.

At block 630, signal data, sensor data, and/or historical data may be received from one or more connected tracking devices.

At block 640, the signal data, the sensor data, and the historical data may be processed and provided to the remote computing device to localize the tracking devices and the items associated with the tracking devices. For instance, data pertaining to each tracking device may be packed together and/or data pertaining battery levels may be associated with indoor localization data.

Referring to FIG. 7, examples of method steps described herein are related to the use of the item tracking system 140. According to one embodiment, the techniques are performed the processor 402 executing one or more sequences of software logic instructions that constitute the item tracking module 414 of the item tracking system 140. In embodiments, the tracking module 414 may include the one or more sequences of instructions within sub-modules including a state determining module 416, an access point localization module 418, a tracking device localization module 420, and a tracking device power management module 422. Such instructions may be read into the memory 404 from machine-readable medium, such as memory storage devices. Execution of the sequences of instructions contained in the state determining module 416, the access point localization module 418, the tracking device localization module 420, and the tracking device power management module 422 in the memory 404 causes the processor 402 to perform the process steps described herein. It is contemplated that, in some implementations, some of the sub-modules, or any other portions of executable instructions constituting the item tracking module 414 may be hosted at a remote device rather than the item tracking system 140. In alternative implementations, at least some hard-wired circuitry may be used in place of, or in combination with, the software logic instructions to implement examples described herein. Thus, the examples described herein are not limited to any particular combination of hardware circuitry and software instructions.

At block 710, tracking of an item may be initiated. For instance, an input may be provided to the tracking device to activate it's components. Further, data pertaining to access point may also be received for localizing the access point in an indoor facility. The data may include signal data pertaining to wireless signals received from other access points in the same indoor facility and sensor data pertaining to the access point.

At block 720, based on the data pertaining to the access point, the access point may be localized in the corresponding indoor facility.

At block 730, it may be ascertained whether the tracking device is indoors or outdoors, based on an input provided by a tracking device. In other words, a location state of the tracking device may be identified. The input may include at least one of a satellite-based data indicative of an outdoor location of the tracking device and a connectivity to an access point. For instance, the satellite based data may have noise greater than a threshold, which may indicate that the tracking device is outdoors. Further, in case the tracking device connects to an access point and the corresponding access point provides data indicating that the tracking device is connected thereto, it may be inferred that the tracking device is indoors. Alternatively, the input may indicate that it is outdoors/indoors, based on assessment performed at the tracking device. and in input from the tracking device may indicate that it is indoors.

If at block 730, it is determined that the tracking device is outdoors, the method 700 may proceed to block 740, where, based on the satellite-based data provided by the tracking device, the tracking device may be localized to a determine a position estimate/location estimate of the tracking device.

However, if at block 730, it is determined that the tracking device indoors, the method 700 may proceed to block 750. At block 750, indoor localization data pertaining a tracking device may be received from an access point. The data may include one or more of sensor data, signal data, and historical data.

At block 760, based on the data pertaining to the tracking device and the data pertaining to the corresponding access point, the tracking device may be localized in the indoor facility. In an example, the data pertaining to the tracking device may be fused using data fusion techniques, such as Kalman filter based techniques. In an example, distance of a tracking device from an access point may be determined based on frequency domain received power. The access point may estimate a current channel state information (CSI) to each tracking device. Further, the a pathloss exponent model incorporating the CSI may be used accurate distance estimates. Each distance estimate may also include an estimated error, which is a function of the estimated CSI and measured signal variance At block 770, details pertaining to localization may be provided on a display to provide for monitoring and tracking of an item by a user.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. An item tracking system comprising
a processor; and
a memory storing a set of instructions, the instructions executable in the processor to:
identify a location state of a tracking device as one of an indoor location indicative of the tracking device being inside an indoor facility and the outdoor location with respect to the indoor facility, based on at least one of a satellite based data received from the tracking device and connectivity to an access point device of the indoor facility, the tracking device being associated with an item to be tracked;
when the tracking device is in the indoor facility, receive, from the access point device, indoor localization data of the tracking device, the indoor facility including a set of tracking devices, the indoor localization data comprising signal data and sensor data, the signal data comprising data pertaining to short range wireless signals received from one or more other tracking devices in the set within a predetermined distance from the tracking device in response to periodically broadcasted short range wireless signal to the one or more other tracking devices to enable localization of the one or more other tracking devices, the data pertaining to the short range wireless signals being used for determining a position of the tracking device relative to the one or more other tracking devices, and the sensor data comprising one of inertial data and ambient environment data associated with the tracking device; and
localize the tracking device to localize the item, based on the indoor localization data and at least one of a position of the access point device in the indoor facility and a position of at least one other tracking device in the set in the indoor facility.

2. The item tracking system of claim 1 further comprising instructions executable to associate, upon localizing the tracking device, a confidence factor with a location estimate of the tracking device, based on historical data associated with the tracking device and the inertial data associated with the tracking device.

3. The item tracking system of claim 2, wherein the historical data includes a time period for which the tracking device has been stationary, the confidence factor being directly proportional to the time period for which the tracking device has been stationary.

4. The item tracking system of claim 2 further comprising instructions executable to provide an input to the tracking device to enter in a low power mode, when the confidence factor is greater than a threshold, wherein in the low power mode the tracking device broadcasts signals to the one or more other tracking devices in the set and halts receiving of the signals from the one or more other tracking devices.

5. The item tracking system of claim 1 further comprising instructions executable to, upon localizing the tracking device, using a location estimate of the tracking device to localize another tracking device in the set in the indoor facility, when the confidence factor associated with the tracking device is greater than the threshold.

6. The item tracking system of claim 1, wherein localizing the tracking device comprises determining, for the access point device, a current channel state information (CSI) to the tracking device.

7. The item tracking system of claim 1 further comprising instructions executable to, upon localization of the tracking device, provide data pertaining to localization of the tracking device in the indoor facility to a user for monitoring the item being tracked using the tracking device.

8. The item tracking system of claim 1 further comprising instructions executable to provide a synchronizing input to each of access point devices in a set in the indoor facility, wherein each of the access point devices broadcast a pilot signal to other access point devices in the set, based on the synchronizing input.

9. The item tracking system of claim 8 further comprising instructions executable to localize the access point device in the indoor facility, based on access point signal data and access point sensor data, the access point signal data being based on pilot signals broadcasted by each of the access point devices in the set.

10. The item tracking system of claim 1, wherein a location estimate of the tracking device includes an estimated error, which is a function of an estimated CSI and measured signal variance.

11. A method for tracking items comprising:
identifying a location state of a tracking device as one of an indoor facility and the outdoor location with respect to the indoor facility, based on at least one of a satellite based data received from the tracking device and connectivity to an access point device of the indoor facility, the tracking device being associated with an item to be tracked;
when the tracking device is in the indoor facility, receiving, from the access point device, indoor localization data of the tracking device, the indoor facility having a set of tracking devices for tracking corresponding items, the indoor localization data comprising signal data and sensor data, the signal data comprising data pertaining to short range wireless signals received from one or more other tracking devices in the set within a predetermined distance from the tracking device in response to periodically broadcast short range wireless signal to the one or more other tracking devices to enable localization of the one or more other tracking devices, the data pertaining to the short range wireless signals being used for determining a position of the tracking device relative to the one or more other tracking devices, and the sensor data comprising one of inertial data and ambient environment data associated with the tracking device; and
localizing the tracking device to localize the item, based on the indoor localization data and at least one of a position of the access point device in the indoor facility and a position of at least one other tracking device in the set in the indoor facility.

12. The method of claim 11 further associating, upon localizing the tracking device, a confidence factor with a location estimate of the tracking device, based on historical data associated with the tracking device and the inertial data associated with the tracking device.

13. The method of claim 12, wherein the historical data includes a time period for which the tracking device has been stationary, the confidence factor being directly proportional to the time period for which the tracking device has been stationary.

14. The method of claim 12 further comprising providing an input to the tracking device to enter in a low power mode, when the confidence factor is greater than a threshold, wherein in the low power mode the tracking device broadcasts signals to the one or more other tracking devices in the set and halts receiving of the signals from the one or more other tracking devices.

15. The method of claim 14 further comprising upon localizing the tracking device, using a location estimate of the tracking device to localize another tracking device in the set in the indoor facility, when the confidence factor associated with the tracking device is greater than the threshold.

16. The method of claim 11, wherein localizing the tracking device comprises determining, for the access point device, a current channel state information (CSI) to the tracking device.

17. The method of claim 11, wherein localizing the tracking device comprises:

inferring a path the tracking device has traversed, based on the sensor data; and cross-referencing the inferred path with access point signal measurements to increase confidence in an estimated location.

18. The method of claim 11 further comprising providing a synchronizing input to each of access point devices in a set in the indoor facility, wherein each of the access point devices broadcast a pilot signal to other access point devices in the set, based on the synchronizing input.

19. The method of claim 18 further comprising localizing the access point device in the indoor facility, based on access point signal data and access point sensor data, the access point signal data being based on pilot signals broadcasted by each of the access point devices in the set.

20. The method of claim 11 further comprising providing data pertaining to localization of the tracking device to a user for monitoring the item being tracked using the tracking device in the indoor facility.

* * * * *